(12) United States Patent
Fuchs (10) Patent No.: US 7,374,716 B2
(45) Date of Patent: May 20, 2008

(54) METALLURGICAL OVEN AND A MATERIAL BASKET FOR A METALLURGICAL OVEN

(75) Inventor: Gerhard Fuchs, Willstadt-Legelshurst (DE)

(73) Assignee: VAI Fuchs GmbH, Willstadt-Legelshurst (DE)

( * ) Notice: Subject to any disclaimer, the term of this patent is extended or adjusted under 35 U.S.C. 154(b) by 571 days.

(21) Appl. No.: 10/487,427

(22) PCT Filed: Aug. 19, 2002

(86) PCT No.: PCT/EP02/09255

§ 371 (c)(1), (2), (4) Date: Feb. 19, 2004

(87) PCT Pub. No.: WO03/019096

PCT Pub. Date: Mar. 6, 2003

(65) Prior Publication Data

US 2004/0239014 A1    Dec. 2, 2004

(30) Foreign Application Priority Data

Aug. 20, 2001 (DE) ............... 101 40 805

(51) Int. Cl.
*C21C 5/46* (2006.01)
(52) U.S. Cl. .............. 266/216; 266/900; 266/901; 373/78
(58) Field of Classification Search ........... 266/216, 266/900, 901; 373/78, 80
See application file for complete search history.

(56) References Cited

U.S. PATENT DOCUMENTS 2,824,762 A    2/1958 Kaiser
4,611,339 A *  9/1986 Saitoh ............ 373/80
4,736,383 A *  4/1988 Meierling ........ 373/80
5,416,792 A    5/1995 Vice
5,645,791 A    7/1997 Fuchs et al.
6,274,081 B1 * 8/2001 Fuchs ............ 266/216
6,404,800 B1 * 6/2002 Fuchs ............ 373/80
6,553,055 B2 * 4/2003 Fuchs ............ 373/80

FOREIGN PATENT DOCUMENTS

| CA | 2 263 963 | 8/2003 |
|---|---|---|
| DE | 4424324 | 1/1996 |
| WO | WO 98/08041 | 2/1998 |

* cited by examiner

Primary Examiner—Scott Kastler
(74) Attorney, Agent, or Firm—Scott E. Kamholz; Foley Hoag LLP (57) ABSTRACT

A metallurgical furnace has a cover (20) for a vessel (10) and a charging device (30) for charging material that will be melted in the vessel. The charging device has a rotatable retaining means (31) and a projection (40) is provided at a charging opening (42). The furnace has a maximum filling level (H2) and the rotatable retaining means is pivoted into the projection for the charging operation. The pivotable range of the retaining means does not extend below the maximum filling level (H2). At least two self-supporting material baskets (32) can be positioned in a removable manner above the projection (40), and each comprises an inner chamber that can be closed on the lower side thereof by the retaining means (31) and a volume (C) for receiving the charging materials. A change device (33) interchanges and positions the material baskets (32).

19 Claims, 10 Drawing Sheets

METALLURGICAL OVEN AND A MATERIAL BASKET FOR A METALLURGICAL OVEN

CROSS-REFERENCE

This application is the national stage filing of International Application No. PCT/EP02/09255, which was filed Aug. 19, 2002 and claimed priority to German Patent Application No. 101 40 805.6 filed Aug. 20, 2001.

TECHNICAL FIELD

The invention concerns a metallurgical furnace, in particular an electric arc furnace, and a material basket for the metallurgical art.

DESCRIPTION OF THE RELATED ART

A metallurgical furnace, such as the electric arc furnace known from WO 98/08041 A1, has a vessel that comprises a lower vessel portion and an upper vessel portion, a cover for the vessel and a charging apparatus, which is in the form of a shaft and in which a pivotable retaining means is arranged. In the smelting operation for such apparatus, the entire charging material (for example, scrap) is charged in one operation. Because the volume of the smelted material, particularly in the case of scrap, is substantially less than in the non-molten condition, the volume defined by the vessel and the cover is not sufficient to receive the entire amount of charging material for a smelting operation. Therefore, the portion of the charging material that is not in the molten condition remains standing as a column within the shaft.

Consequently, the retaining means, which is formed by a plurality of pivotably mounted fingers, cannot be pivoted back into the closed condition until the column of the charging material has melted together to such an extent that the top side of the column is below the range of pivotal movement of the retaining means (see in particular FIG. 4 of WO 98/08041 A1).

In order to charge the entire amount of the charging material into the furnace all at once, the shaft must have a corresponding volume, which means that the shaft must be very high due to the spatial requirements, in particular the arrangement of the electrodes, in the arc furnace. In the alternative, the shaft may be designed only to receive the amount of the charging material that will be charged in one operation. In that case, additional charging material must be charged via the shaft by means of a crane and a material basket (for example, a scrap basket). In any event, the shaft is loaded with the charging material from above, thereby meaning that sufficient space above the shaft must be provided for the loading apparatus, such as a crane or the like. All in all, such an arrangement requires a very large height to be available above the shaft when the steel works are built.

When loading the shaft with the charging material, for example with scrap, the charging material drops from a height of 4 to 6 m, because the material must be dropped into the shaft from above. As a result, there is a possibility of damaging the retaining member and/or the shaft walls.

Because of the necessary structural height, an arc furnace of the kind described in WO 98/08041 A1 is normally constructed with a shaft that is designed for half the necessary amount of charging material. The balance of the charging material for the smelting operation is charged into the furnace through the shaft from above by means of a material basket (scrap basket). Because only a portion of the charging material (scrap) that was stored in the shaft during the refining period for the preceding charge is preheated, a considerable portion of the charging material is at a relatively low temperature at the beginning of the smelting operation; thus the waste gas that passes through the shaft is at a very low temperature. For known reasons, that low temperature is disadvantageous with respect to pollutants, in particular so-called VOCs (Volatile Organic Compounds). For example, VOCs must be incinerated at a temperature of about 700 to 800° C. and the resulting waste gas then must be quenched (rapidly cooled down) so that the renewed formation of pollutants does not occur. The waste gas that passes through the shaft and the cold charging material is far from being at the appropriate temperature, such that a considerable introduction of energy is required into a post-combustion chamber in order to destroy the VOCs. The additional energy requirements results in increased operating costs.

Because the shaft and the retaining means formed by the fingers are supported on the furnace during all operating cycles, cooling of the retaining means and at least the lower part of the shaft is necessary for thermal reasons. The corresponding design configuration of the shaft means that a carrier structure is required for the shaft, which carrier structure, on the one hand, holds the cooling system and the necessary supply arrangements and, on the other hand, forms a sufficient support device for the scrap that is charged via the shaft. In addition, during the charging operation of the charging material, in particular scrap, through the shaft, considerable dynamic forces occur due to the great dropping height, and those forces entail the risk of damage to the shaft and the fingers, in particular the cooling arrangement. Due to the high dynamic forces involved, it is also necessary for the fingers of the retaining member to be individually mounted and to be replaceable in an expensive and complicated configuration, for example with spring packs. That results in the structure having an increased complexity, and an increased volume necessary due to the increased complexity, with respect to the retaining means.

Due to the foregoing aspects, the volume of the shaft, in particular the presence of the carrier structure, the cooling arrangement, etc. is relatively large, such that, in order to maintain the necessary spacing relative to the electrodes at the centre of the cover of the furnace vessel, the shaft must be disposed relatively far away from the center in the direction of the edge of the cover or the vessel.

EP 0 672 881 A1 discloses an arc furnace having two charging shafts, which shafts have charging openings that are arranged laterally at the side walls of the unit formed by the vessel and the cover.

DE 44 24 324 A1 and DE 43 26 369 A1 each disclose retaining means formed by divided fingers for a shaft. FIG. 1 of DE 44 24 324 A1 illustrates an example of a conventional arc furnace in which a material basket 27 is disposed above the shaft for further charging of charging material, thereby requiring the above-described necessary internal height above the shaft.

JP 7-332836 (A) discloses an arc furnace having a shaft in which two charges are held one above the other, each by appropriate retaining members. The Steel Times International, November 1995, discloses the so-called 'Daido MSP-DC Arc Furnace' that is also published in a paper of the SEAISI 1996 THAILAND CONFERENCE under the title "Development of MSP-DC EAF Process." That furnace has a charging apparatus in the form of a shaft. Two chambers are arranged in a perpendicularly mutually superposed relationship in the shaft. Each of the chambers can be closed at its underside by a pivotable retaining means. The entire shaft can be displaced laterally with respect to the furnace vessel for maintenance purposes or the like. The chambers of the shaft are loaded from above by means of a scrap basket.

DETAILED DESCRIPTION OF THE INVENTION

Described hereinafter with reference to FIGS. 1 to 8 is a first embodiment of a metallurgical furnace according to the invention, which represents the preferred embodiment.

FIGS. 1 to 4 show the first embodiment in a first configuration in which material baskets 32, which can be positioned by means of a changing device 30 above a projection 40, are used as the shaft.

FIGS. 5 to 8 show a second configuration of the first embodiment, in which the charging opening 42 of the projection is closed by means of a cover 43 in the melting operation in the manner of a conventional arc furnace that does not have a shaft. That configuration can be used to continue operation when maintenance procedures are to be performed on the changing device and/or the material baskets or the like.

The first configuration will now be described with reference to FIGS. 1 to 4.

The first embodiment is formed as an arc furnace 1 with a furnace vessel 10 supported on a furnace cradle 2. The furnace vessel 10 comprises a lower vessel portion 11 formed by a brick-built furnace hearth and an upper vessel portion 12 that is formed in the usual manner with water-cooled elements. The furnace vessel has a bay 13 with a tap hole 15 and a closure device 16 for the tap hole 15.

The furnace also has a cover 20 that is formed in the usual manner with water-cooled elements and, which in the usual manner, has openings for the electrodes 71 to be introduced into and removed from the furnace vessel. In the first embodiment shown in FIGS. 1 to 4, the cover has a projection 40 that, in the plan view of the vessel 10 and the cover 20, is disposed on one side of the electrodes. The projection 40 is made of water-cooled elements and is joined to the cover 20.

In accordance with an alternative embodiment, the projection 40 can also be formed separately from the cover 20. The projection 40 can then be in the form of a separate part or part of the vessel 10.

Preferably, the projection 40 is part of the cover 20. In that case, the projection 40 can be lifted off together with the cover 20 by the lifting device for the cover, for example during maintenance operations, and can be pivoted or moved away.

The projection 40 is substantially cylindrical with a cross-section that is substantially rectangular in the horizontal direction. In the first embodiment shown in FIGS. 1 to 4, the projection 40 has substantially perpendicular walls in the vertical direction of the furnace vessel. As can be seen from FIGS. 2 and 4, adaptation of the substantially rectangular shape of the projection to the substantially round cross-section (broken line 14 in FIG. 4), as viewed in cross-section in the horizontal direction, of the furnace vessel, is substantially effected by the side walls of the furnace vessel 12 having an appropriate configuration.

In the alternative, the corresponding adaptation can be effected by modifying the shape of the projection 40 so that the walls of the vessel 12 are perpendicular and adapted to the shape of the lower vessel portion. This alternative embodiment, which is not shown in FIGS. 1 to 4, is preferred because it reduces the height from which the charging material drops on to the inclined walls, and the resulting dynamic loading thereon.

The projection 40 has an opening 41 laterally above the height H2 and below the height H1, which opening 41 serves as an extraction opening for suctioning away waste gas. The extraction opening 41 is connected via a waste gas conduit 61 to a waste gas main conduit 62 that communicates with a post-combustion chamber 60. A controlled valve flap 64 is provided in the waste gas conduit 61. The projection 40 has an upwardly open opening 42, which is a charging opening for the furnace.

A charging apparatus 30, which has a rotary tower or turret 33 as an embodiment of a changing device, is provided for the operation of charging the charging material. In the present case, scrap is exemplified as a batch material that is charged into the furnace using the charging apparatus 30.

In the first embodiment, an electrode arrangement 70 having an electrode holding and displacement device 72 for holding and displacing the electrodes 71 is arranged on one side (the left-hand side in FIG. 2) of the furnace vessel 10. The charging apparatus 30 is arranged on the corresponding other side of the furnace vessel 10 (the right-hand side in FIG. 2).

The changing device 33, which is in the form of a rotary tower, has two cantilever arms 34 that are displaced 180° about the vertical rotational axis 35 of the rotary tower 33, each being designed to hold a respective material basket 32. The cantilever arms 34 are dimensioned so that a material basket 32 held thereby can be positioned over the charging opening 42 of the projection 40. The changing device is designed so that the arms 34, and also the material baskets 32, can be lifted upwardly in the direction of arrow A (see FIG. 2) or can be lowered downwardly in the opposite direction.

In that respect, the charging apparatus 30 is designed so that the empty material basket 32 (at the left in FIG. 2) can be lifted by a lifting movement in the direction of the arrow A. In addition, the empty material basket 32 can be exchanged for the full material basket 32 (at the right in FIG. 2) by rotating the changing device 180° about the axis 35 and the full material basket 32 can then be lowered onto the projection 40 over the charging opening 42 by a lowering movement in the direction opposite of arrow A. Therefore, the material baskets 32 are always held by the arms 34 of the changing device 30 and are not carried by the projection 40. The transition between the material baskets 32 and the projection 40 can be sealed off in a suitable manner, for example by using skirts.

In the embodiment shown in FIGS. 1 to 4, the arms 34 are lifted upwardly as a whole in the direction of arrow A and are lowered in the opposite direction. In the alternative, as can be seen from FIG. 9, the changing device can be provided with cantilever arms 34 that are individually pivotable about a horizontal axis 36 or with cantilever arms 34, which are pivotable in the manner of a rocker member about a horizontal axis 36. This design configuration, in which the arms 34 are pivotable about the horizontal axis, affords a further saving in terms of reducing the height requirements of the building of the steel works. This embodiment is therefore to be preferred when there are particular requirements for a reduction in height.

Figure 9:
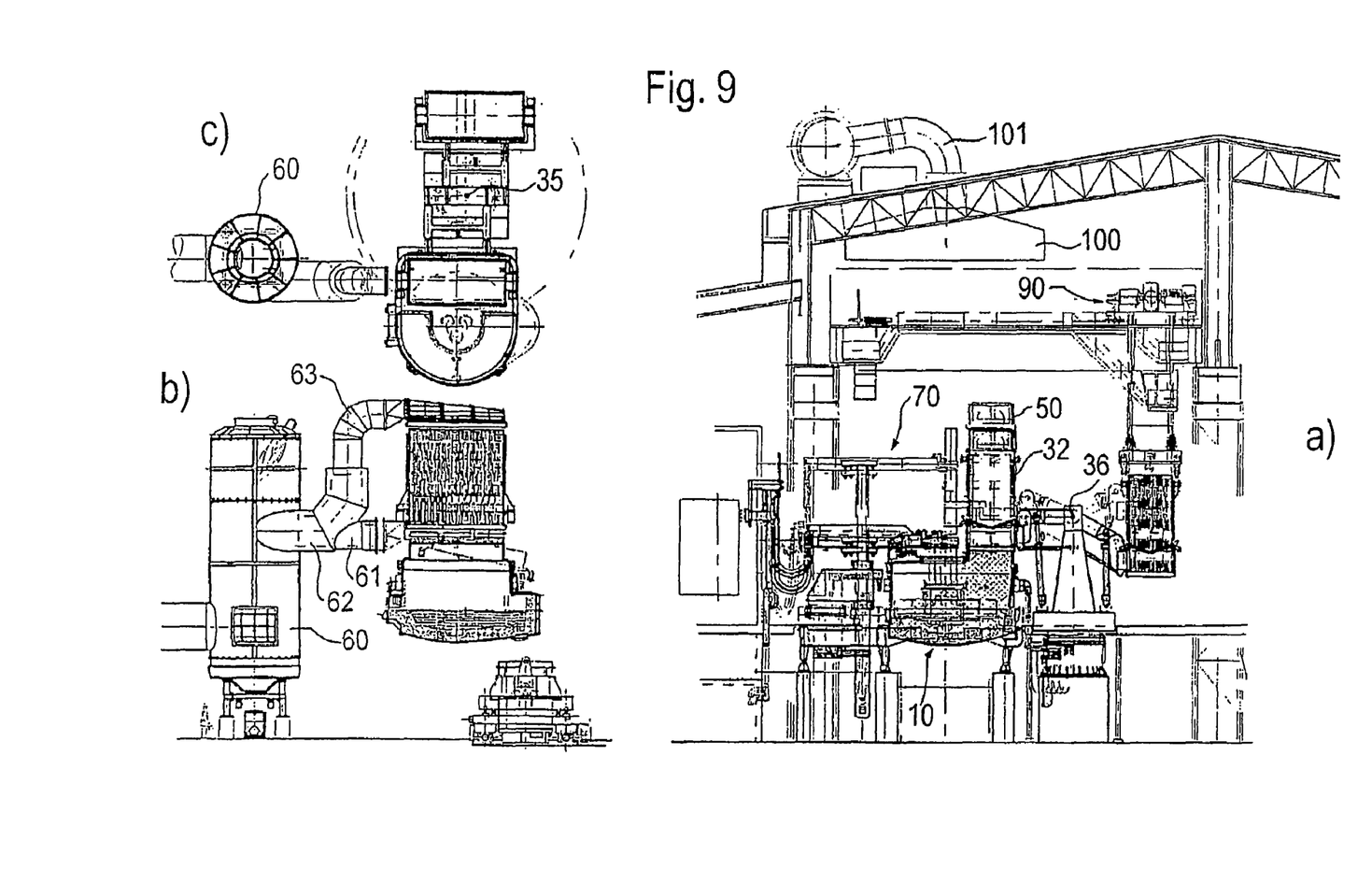
FIG. 9 shows a second embodiment of the metallurgical furnace as a front view a) in cross-section in a steel works, a side view b) in cross-section, which is taken from the left in FIG. 9a), and a plan view c) in cross-section.
Figure 10:
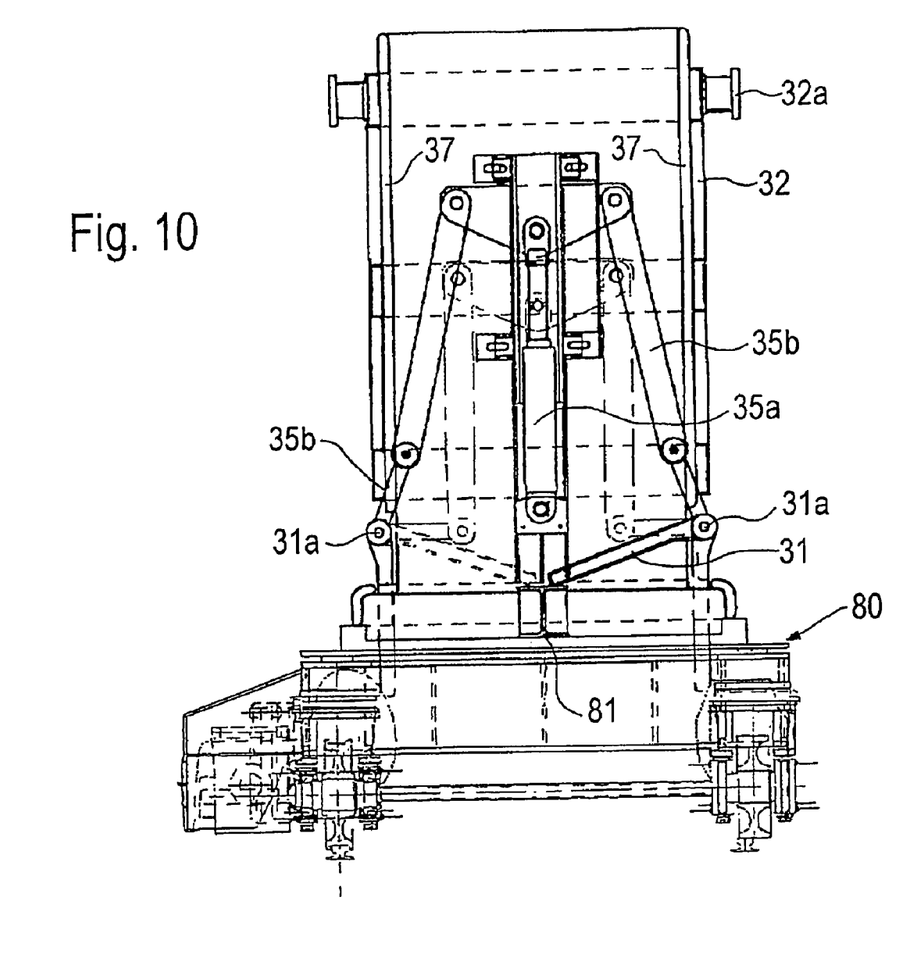
FIG. 10 is a cross-sectional view of a material basket in accordance with an embodiment of the invention, the material basket being disposed on a transport carriage.

An embodiment of the material basket 32, which is in the form of a scrap basket, is shown in greater detail in FIG. 10 in the condition in which the scrap basket 32 is supported on a carriage 80. As can be clearly seen from the plan view in FIG. 4, the scrap basket 32 has a rectangular cross-section in the horizontal direction. Projections 32a are provided at the side walls corresponding to the longer sides of the rectangle, which projections 32a enable engagement with the holding elements 91 of a crane 90 (see FIGS. 2 and 9). A shaft 31a is provided at the underside of those longer side walls and fingers 31 of the retaining means (retaining member) are mounted/pivoted thereon. The fingers 31 have a length that substantially corresponds to half the length (preferably somewhat more) of the short side of the rectangular shape, as can be clearly seen from FIG. 10. The fingers are laterally spaced from each other in such a way, for example at a spacing corresponding to their width, that an intervening space is provided for gas to pass therethrough. The fingers 31 are pivotable about the shafts 31a by means of an actuating member in order to close and open the underside of the scrap basket 32. The actuating member has a hydraulic cylinder 35a and a lever arrangement 35b, which pivots the fingers 31 about the shaft 31a in the described manner, as can be seen from FIG. 10. The actuating member can be provided either only on one short side or on both short sides of the scrap basket 32.

The scrap basket 32 is loaded at a storage area for the charging material, for example at a storage area where the collected scrap is stored for the steel works. When the scrap basket 32 is loaded, the fingers 31 are supported from below at their free ends by a support 81 that is provided on the carriage 80. Therefore, during the loading operation of the scrap basket 32, both ends of the fingers 31 are firmly supported, thereby forming a stable lower boundary for the scrap basket 32.

The internal space of the scrap basket 32 has a predetermined volume C and is lined with heat-retaining panels (thermopanels) 37, which are cast steel panels in the preferred embodiment. The fingers 31 are cut from steel ingots in the preferred embodiment and have a cross-section of about 300 mm (horizontal)×200 mm. Depending on the respective requirements involved, the lengthwise dimension can be selected to be different, but the thickness should be not less than 100 mm.

The scrap basket 32 does not have water cooling either at the fingers 31 or at the side walls 37.

In addition, at the scrap storage location, the scrap basket 32 is loaded in portions of the total filling quantity, e.g., by a procedure in which 3 to 5 tonnes of scrap is loaded in one operation by an excavator or the like into the scrap basket, which has a capacity for example of 50 t or 80 t, thereby minimizing the dynamic forces involved during the loading operation. Therefore, the self-supporting structure of the scrap basket 32 is not required to bear the high dynamic forces that occur when charging 50 or 80 tonnes of scrap all at once into the shaft of a conventional furnace. The structure of the scrap basket 32 is therefore only designed to hold the weight, and not to receive the dynamic forces that are produced when 80 tonnes of scrap drops from a height of 6 meters. This structure saves on costs and considerably reduces the outer dimensions in comparison with a shaft having the same internal volume.

The scrap basket 32 shown in FIG. 10 has an approximately rectangular cross-section. In another embodiment of the scrap basket, at least one side wall, which in operation in the position on the projection 40, faces towards the electrode arrangement 70 (the side wall, at the left in FIG. 4, of the scrap basket disposed above the projection 40) has a convex configuration. The outside wall has a radius of curvature in the horizontal direction that corresponds to the radius R (see FIG. 4) of the pivotal movement of the outside wall about the axis 35 during the rotational movement of the rotary tower 33. By virtue of this arrangement, the basket can have a greater volume and can be mounted closer to the electrodes without colliding with the electrodes 71 or the electrode arrangement 70 during pivotal movement.

It is clear that one or more of the other outside walls can also have a convex configuration in order to increase the volume of the internal space. In that case, it is possible to select the same radius of curvature so that the scrap basket can be used in both possible orientations. In the alternative, the side wall, which arranged in opposite relationship to the electrode arrangement, can be, for example, conformed to the outside shape of the vessel wall. It will be appreciated that, in this embodiment, the shape of the projection 40 is also conformed in horizontal cross-section to the horizontal cross-section of the scrap basket 32 to the one or more convex outside walls.

SUMMARY OF THE INVENTION

The object of the present invention is to provide an improved metallurgical furnace and a material basket suitable for such a furnace.

This object is attained by the furnaces and material baskets disclosed herein.

In a metallurgical furnace according to the present teachings, the retaining means can be pivoted back immediately after the charging operation in order to close the charging apparatus. This design results in a configuration of the charging apparatus with suitable interchangeable material baskets, in which the corresponding material basket can be exchanged immediately after the unloading operation. In addition, this design provides an empty space in the upper region of the projection, in which space it is possible to influence the waste gas.

When the charging apparatus is designed with the interchangeable material baskets, there is no need to provide cooling means for the retaining means and the shaft, because they do not heat up so greatly so as to require cooling, due to relatively short residence time above the projection.

In addition, when the charging apparatus is designed with the interchangeable material baskets, the need for a large internal height above the furnace is eliminated, because the material baskets can be replaced by moving them laterally over the projection.

Because the empty space within the projection above the charged material is normally always above the firing temperature for combusting coal dust and/or CO, the waste gas temperature/waste gas composition can be adjusted in a very simple and inexpensive manner by simply injecting coal dust and/or oxygen into the waste gas.

In such a configuration of the charging apparatus having interchangeable material baskets, there is no longer any need for a shaft carrier structure and a water cooling arrangement. Therefore, when the charging volume is the same, the corresponding material baskets can be arranged substantially closer to the electrodes than known shafts. Therefore, it is possible to use a vessel shape that is round in plan view, instead of a horseshoe shape.

Further features and advantages will be apparent from the description of embodiments by way of example with reference to the Figures.

Figure 4:
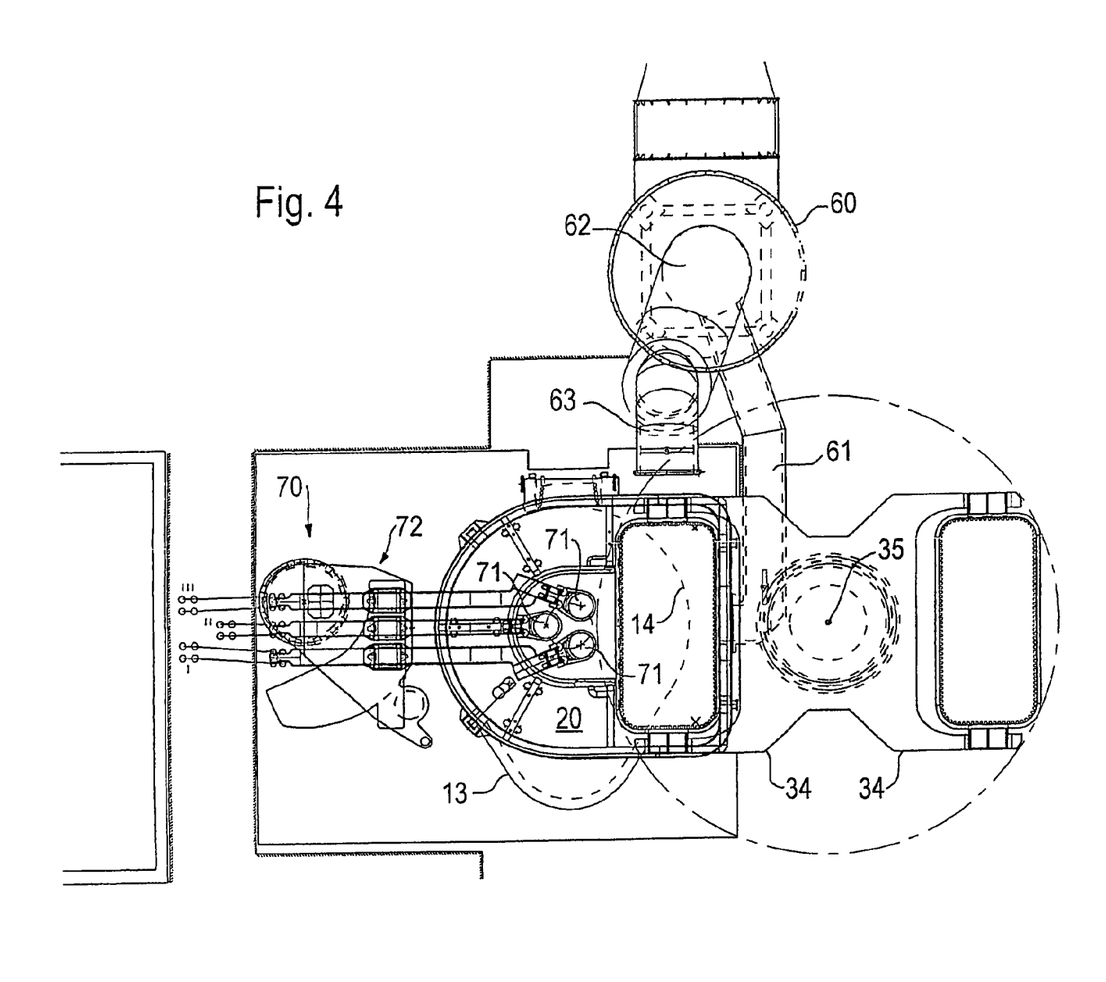
FIG. 4 shows the plan view of FIG. 1c) in an enlarged scale.
Figure 5:
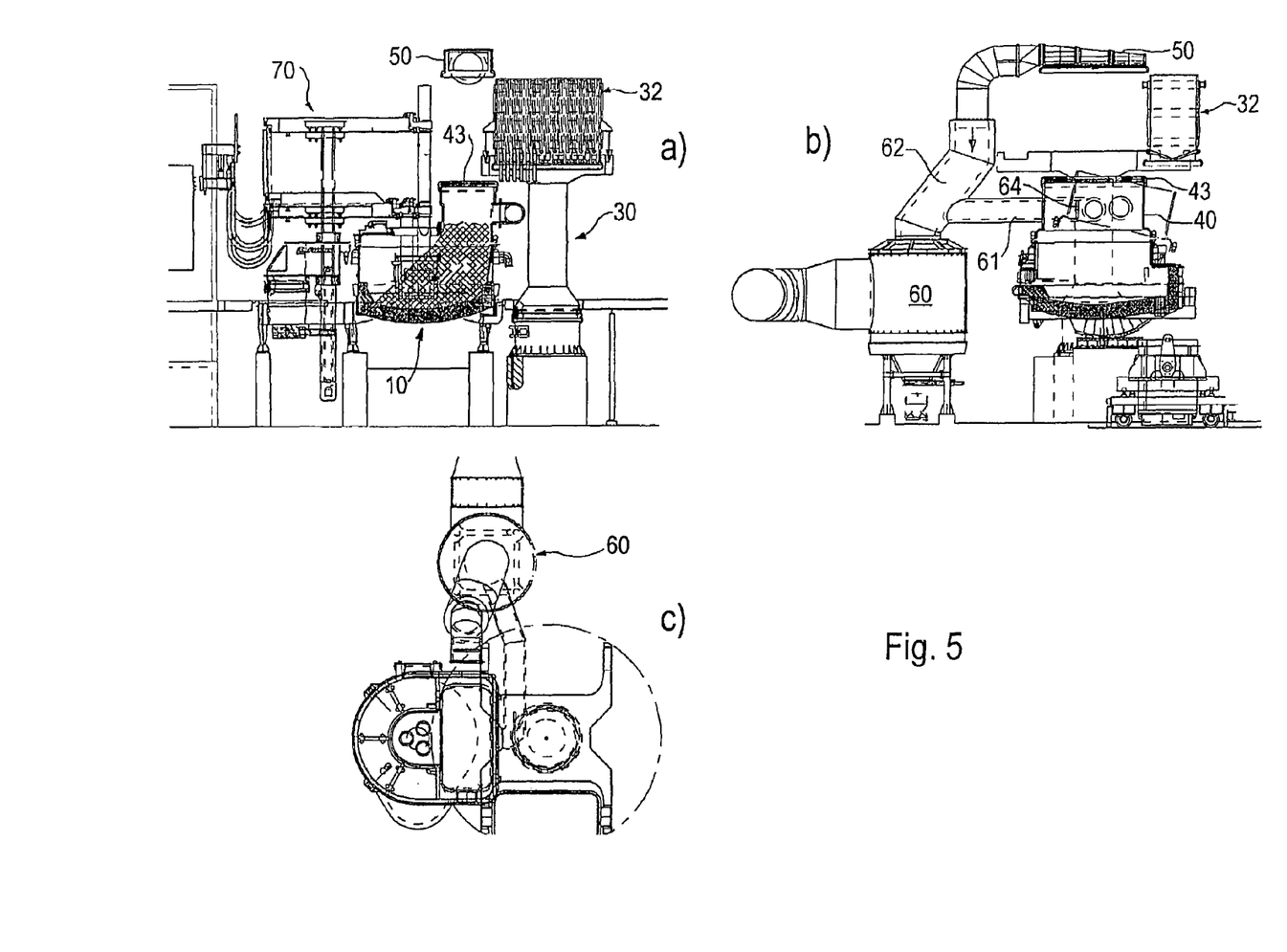
FIG. 5 shows the metallurgical furnace of the first embodiment of FIG. 1 which, for operation as an arc furnace without a shaft, is closed by means of a cover, as a front view a) in cross-section, a side view b) in cross-section, which is taken from the left in FIG. 5a), and a plan view c) in cross-section.
Figure 6:
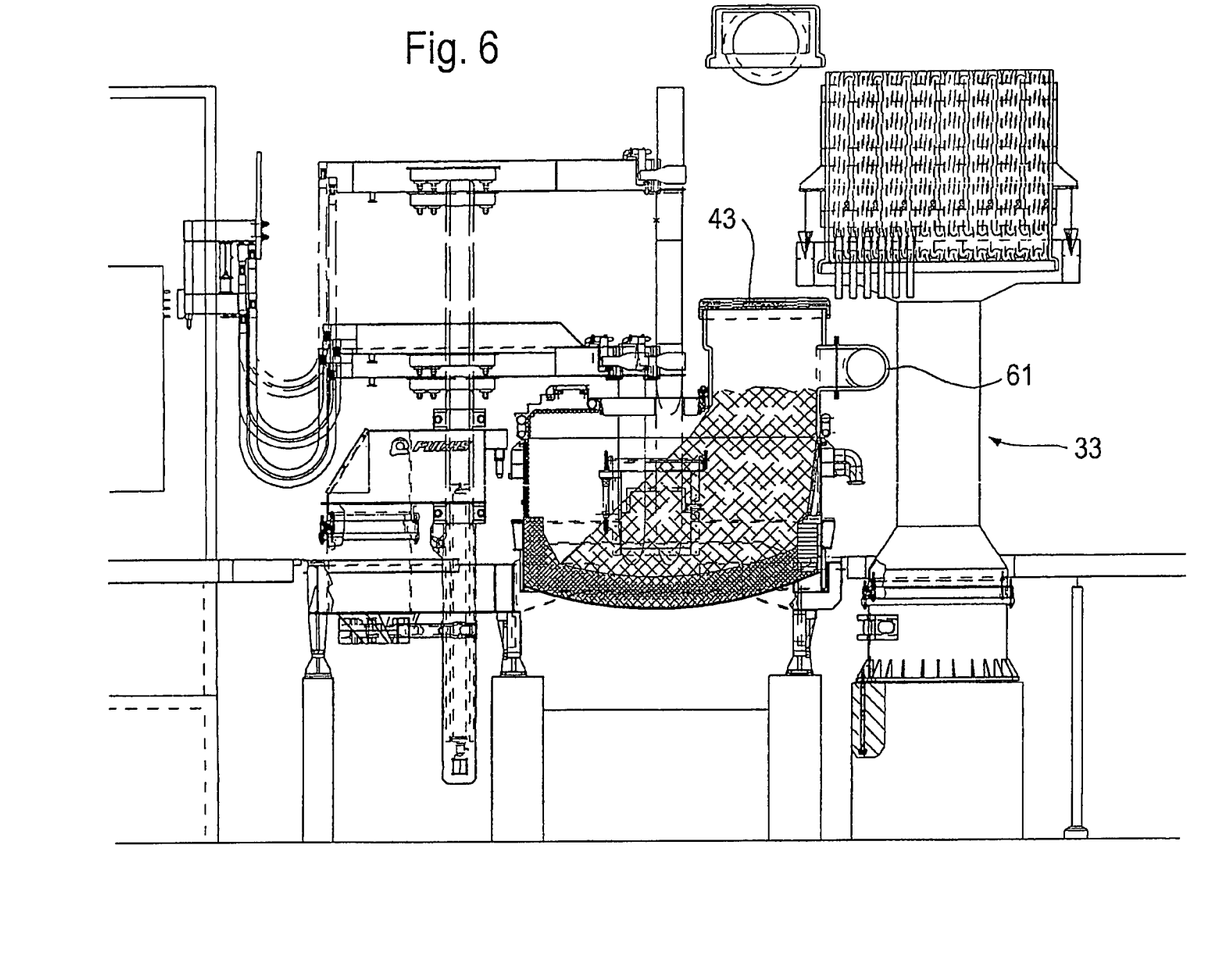
FIG. 6 shows the front view of FIG. 5a) in an enlarged scale.
Figure 7:
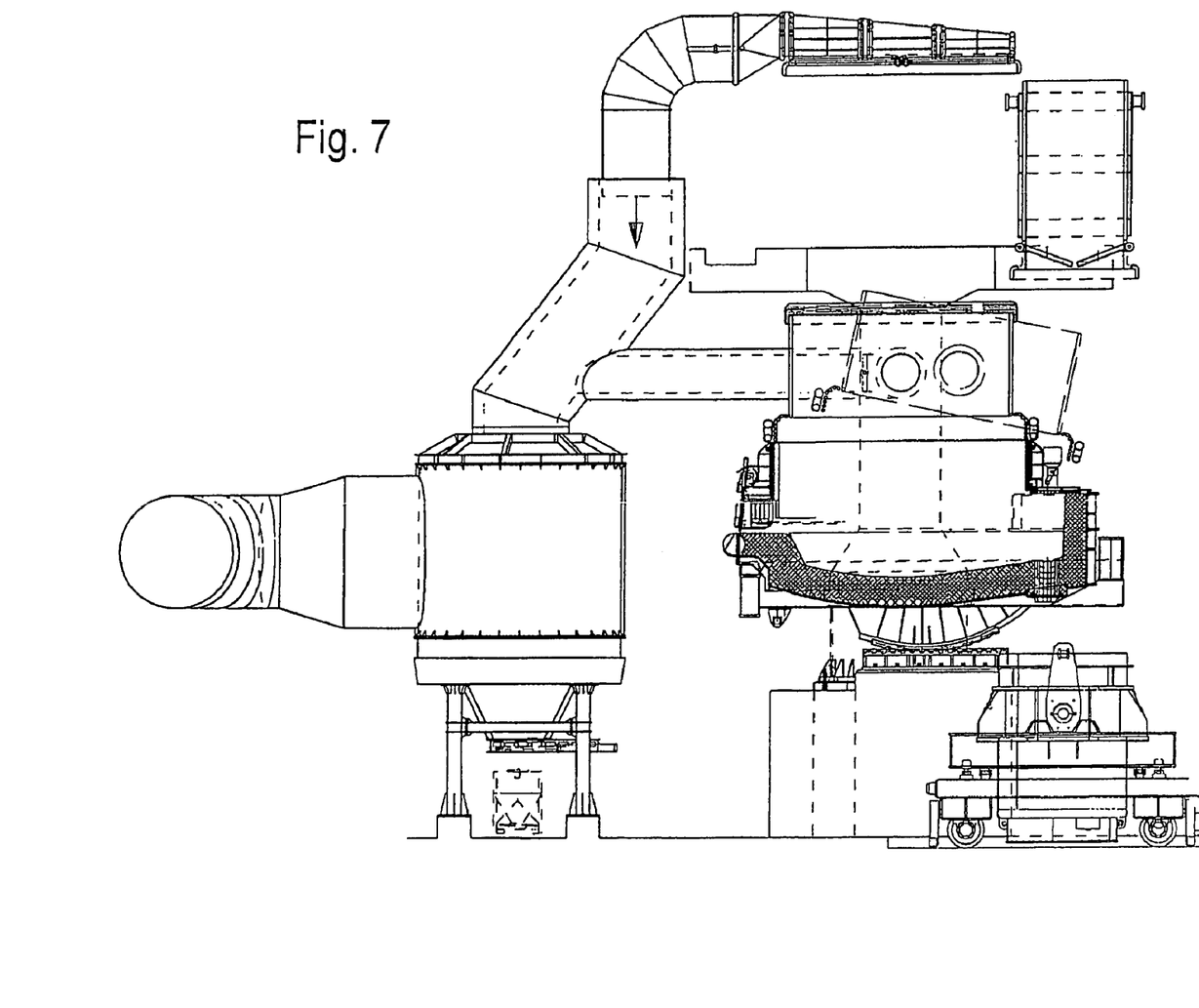
FIG. 7 shows the side view of FIG. 5b) in an enlarged scale.
Figure 8:
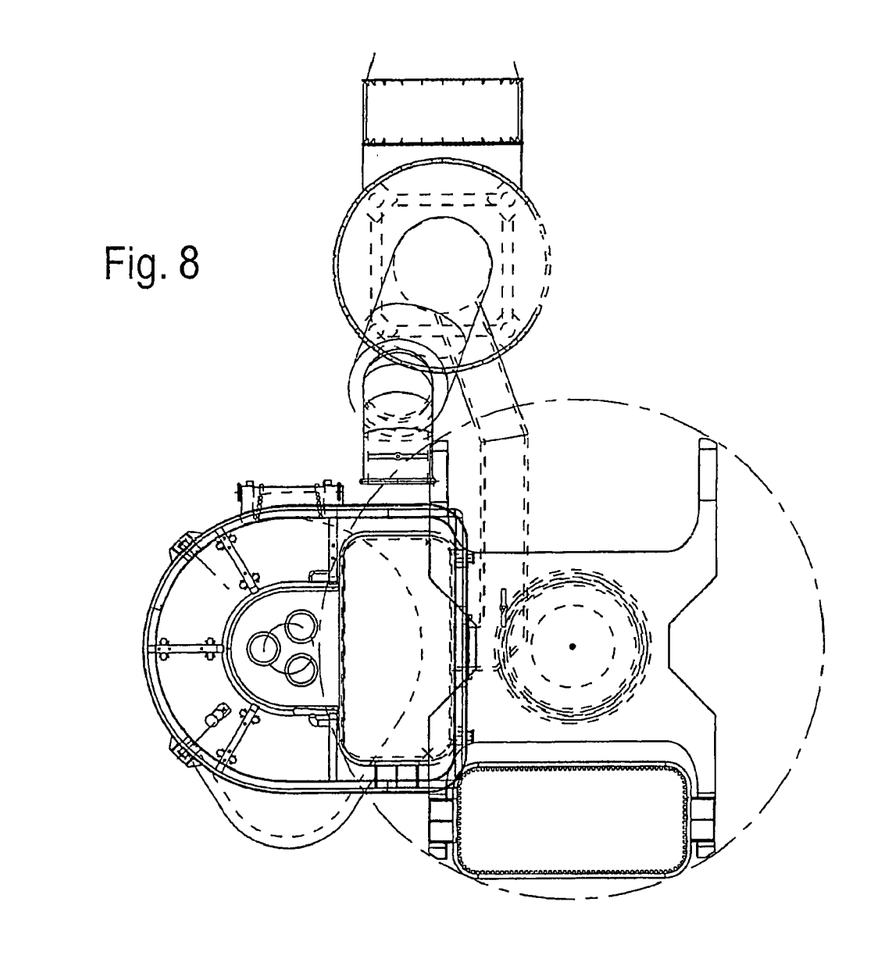
FIG. 8 shows the plan view of FIG. 5c) in an enlarged scale.

Alternatively, it is also possible for the scrap basket 32 and the projection 40 to be designed such that the scrap basket 32 has a rectangular cross-section, as viewed in section in the horizontal direction, such that the corners of the scrap basket in the position above the projection 40 project beyond the circle of radius R (see FIG. 4). In this case, during the pivotal movement of the basket about the axis 35, the corners of the scrap basket 32 would collide with the electrodes. To avoid that situation, the arm 34 is designed so that, prior to the rotational movement, the scrap basket is moved radially in the direction of the rotational axis 35 until the corners are on or within the radius R, which then precisely no longer collides with the electrodes. Thus, collision avoidance can be effected, on the one hand, by movement in the horizontal direction or, as is possible for example with the embodiment shown in FIG. 9, by pivotal movement about a horizontal axis 36 that also has a radial component.

The furnace of the first embodiment also has an extraction hood 50 that is movable upwardly and downwardly in the vertical direction and that is suspended substantially vertically above the projection 40. The extraction hood 50 is connected via a waste gas conduit 63 to the main waste gas conduit 62. A controllable valve flap 65 is provided in the waste gas conduit 63. The extraction hood 50 can be lowered together with the waste gas conduit 63 in the direction of arrow B (see FIG. 3) or can be lifted in the opposite direction. That lifting and lowering movement is necessary to permit adequate free space for lifting and lowering the scrap basket 32 above the projection 40 when changing the scrap basket 32 or when tilting the furnace vessel for the tapping operation (see FIG. 3).

The extraction hood 50 has a lower intake opening. The cross-section of the lower intake opening is matched to the shape of the upper portion of the material basket 32, so that the extraction hood 50 seals off the upper portion of the basket when it is lowered onto the material basket 32.

Figure 3:
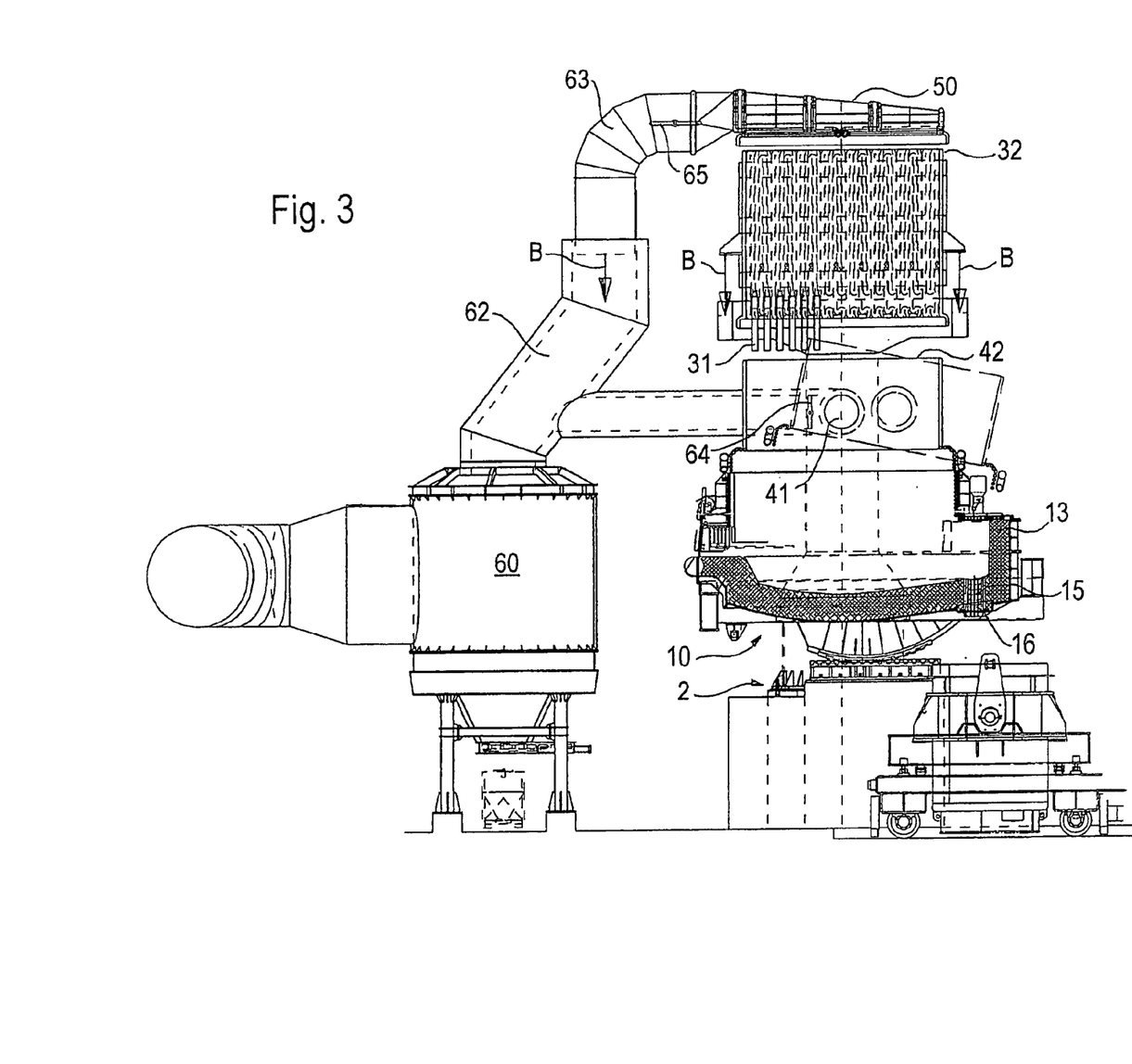
FIG. 3 shows the side view of FIG. 1b) in an enlarged scale.

As can be clearly seen from FIG. 3, the furnace vessel 10 can be tilted by means of the cradle 2 for the tapping operation (see the broken-line illustration of the projection 40 in FIG. 3). In this case, the waste gas conduit 61 is designed so that it is variable in length by a suitable displaceable portion that slides within a sleeve.

Nozzles are provided on the projection 40 for injecting coal dust (or another fuel) and oxygen. A waste gas analyzer (not shown) is provided at the post-combustion chamber 60, which waste gas analyzer measures in real time the composition of the waste gas that is exhausted from the post-combustion chamber 60. The nozzles (feed device) for fuel and oxygen, as well as the valves 64 and 65 and the waste gas analyzer, are connected to a control system that can be programmed to control and regulate the waste gas composition.

Figure 1:
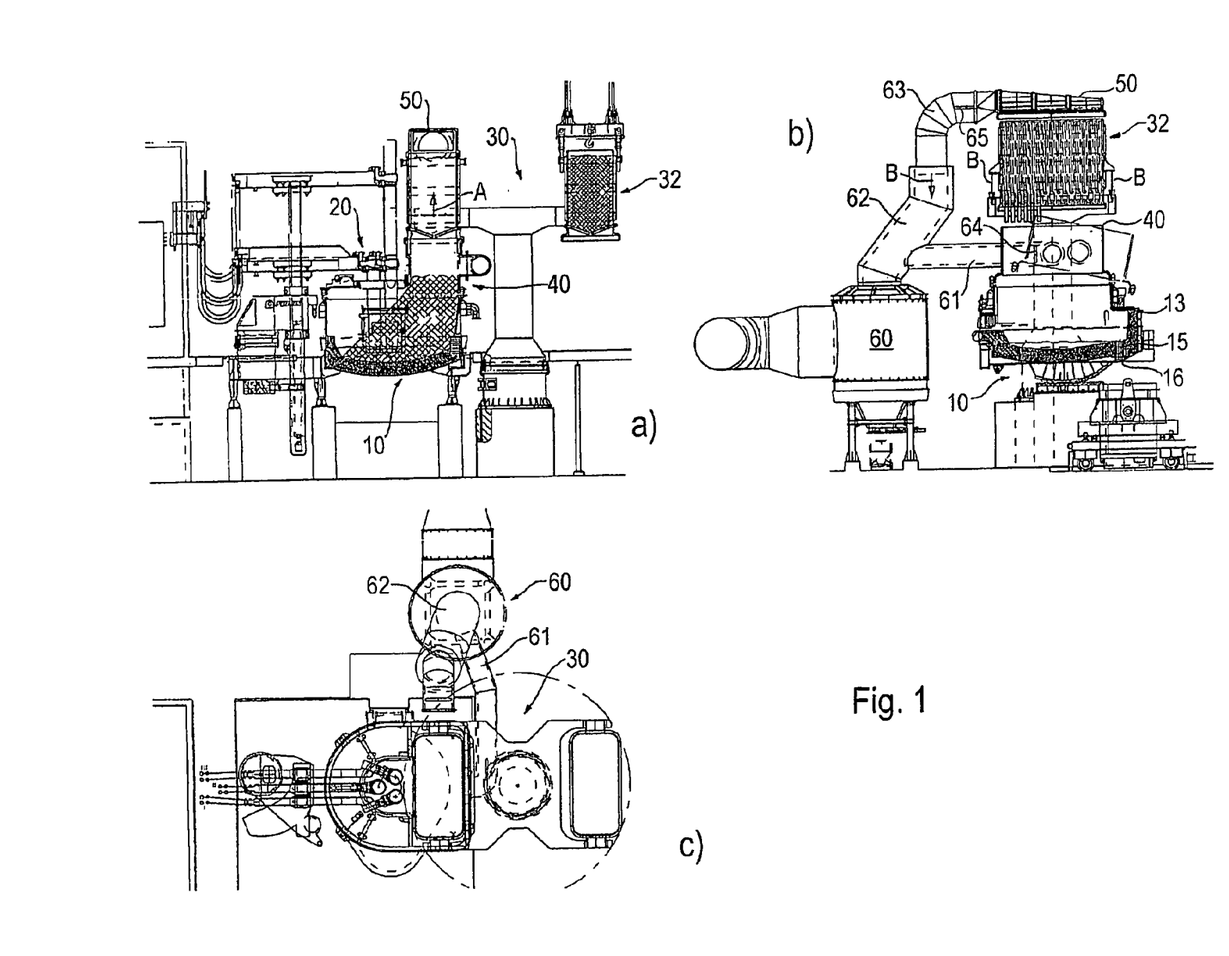
FIG. 1 shows a metallurgical furnace of a first embodiment of the invention in a front view a) in cross-section, a side view b) in cross-section, which is taken from the left in FIG. 1a, and a plan view c) in cross-section.

The configuration of the first embodiment, as shown in FIG. 1, enables the arc furnace to operate as a shaft furnace. In this case, the material basket 32, which is positioned above the projection 40, performs the function of the shaft, which is covered at its upper position by the extraction hood 50. The changing device can change the material basket 32 in about 30 seconds. As a result, the material in a first material basket can be preheated during the refining period of the preceding smelting procedure. When the furnace is refilled after the tapping operation of the preceding smelting procedure, that preheated charge of material can be charged into the furnace (see FIG. 2). Then, a second material basket 32 (at the right in FIG. 2), which is filled with a second charge, can be positioned over the projection 40 within 30 seconds so that that charge is preheated during the smelting operation of the first charge. Once again, the material basket 32 serves as a shaft.

If maintenance or repair operations will be carried out for the charging apparatus 30 or the material baskets 32 or the like, the arc furnace of the first embodiment, in the second configuration shown in FIGS. 5 to 8, can be operated as a conventional furnace with a cover (not as a shaft furnace) in order to avoid a complete stoppage of operation.

For that purpose, the charging opening 42 of the projection 40 is closed with a cover 43. For the charging operation, the cover 20 with the projection 40 (and the cover 43), as well as the electrodes 71, can be lifted in a conventional manner and pivoted away. In the alternative, charging can be effected through the projection 40 after the cover 43 has been lifted off.

The empty space in the projection 40, which is closed off by the cover 43, serves in that situation as a conventional furnace waste gas discharge conduit.

As the second configuration does not differ in other respects from the first configuration, a further description is not provided herein.

A second embodiment of the arc furnace of the invention is shown in FIG. 9. As has already been described above, in this embodiment the changing device 33 is provided with cantilever arms 34 that are individually pivotable about a horizontal axis 36. The arms 34 also can be jointly pivoted as an arm of a rocker member about the axis 36.

As can be clearly seen from FIG. 9, and this applies with respect to all embodiments of the invention, the structural height above the shaft can be markedly reduced because there is no need to provide space for an additional scrap basket or charging material container that is held by the crane 90 above the shaft or material basket 32 during the charging operation.

FIG. 9 shows a cover suction arrangement 100 that is connected via a waste gas conduit 101 to a waste gas disposal system. The waste gas disposal system can be, for example, the post-combustion chamber 60 or another apparatus.

In all embodiments, such an arc furnace is designed for a specific amount of material to be smelted. Thus, for example, there are 100 ton furnaces or 160 ton furnaces. Such an amount of material to be smelted corresponds to a specific volume of the batch material, for example scrap.

In the embodiments of the invention, the furnace vessel and the projection preferably are dimensioned such that the amount of scrap that corresponds to half the charge to be smelted (that is to say 50 tonnes in the case of a 100 ton furnace) extends in a loose material column, which is introduced through the projection 40 in the non-molten condition, at a maximum as far as the height H2 (maximum filling height) of the projection 40. Therefore, the approximate volume of the furnace vessel that is occupied by a loose material column which extends from the lower edge 44 of the projection 40, which is closest to the electrode arrangement 70, at an angle of 45° to the bottom of the lower vessel portion 11 and fills the part of the vessel that is below the projection 40, substantially corresponds to the volume C of a material basket 32 (FIG. 2).

Figure 2:
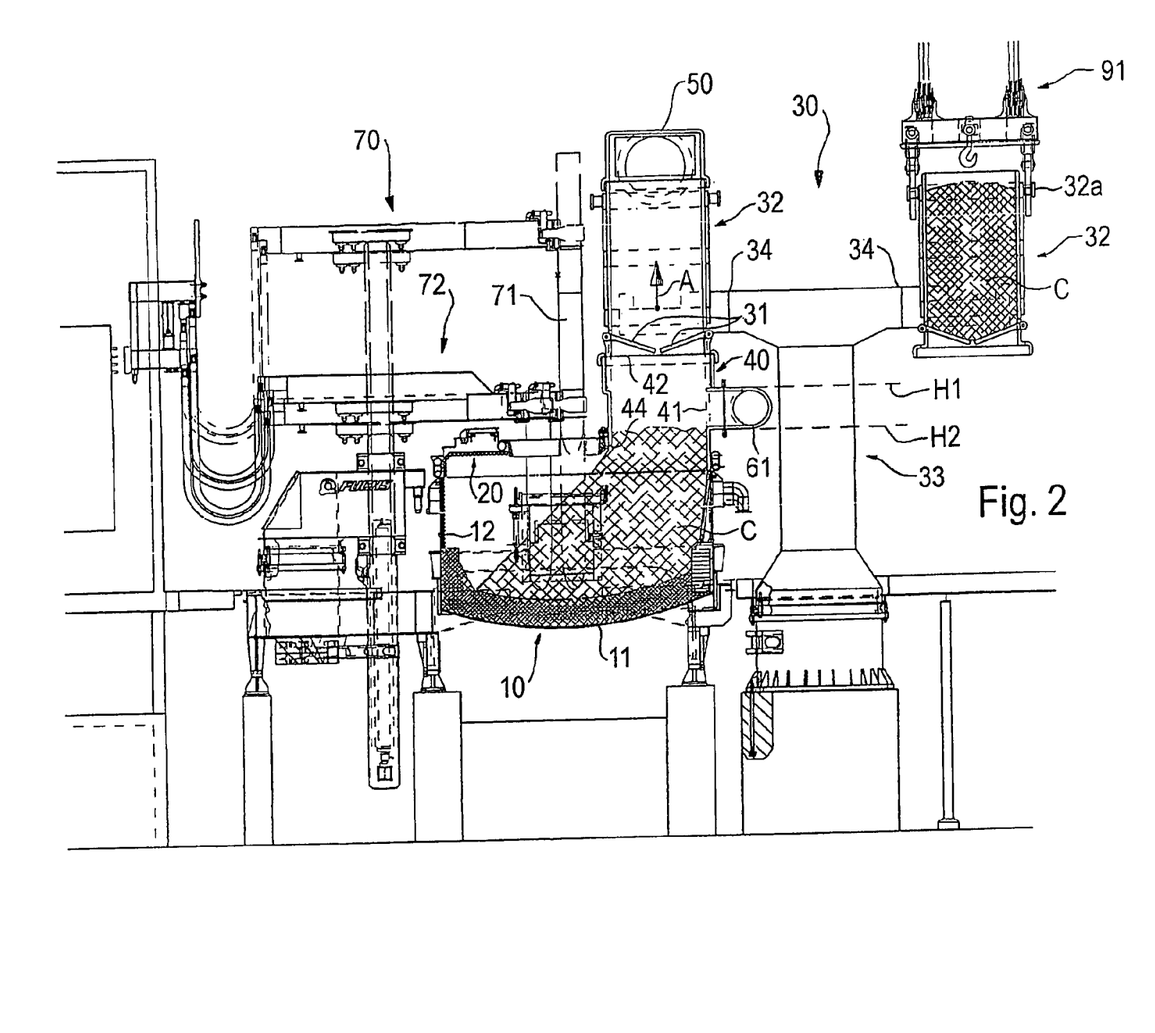
FIG. 2 shows the front view of FIG. 1a) in an enlarged scale.

The lower edge of the suction intake opening 41, which is at the height H2, is preferably slightly higher than the lower edge 44, which is disposed towards the electrodes, of the projection 40, as can be clearly seen from FIG. 2. In FIG. 2, the loose material column forming the charge C is slightly higher than the lower edge 44, which is disposed towards the electrodes, of the projection 40, and this represents an amount which is still tolerable, as will be clear hereinafter with reference to the description of furnace operation.

Operation of the arc furnace of the embodiments of the invention in the first configuration will now be described.

During the refining period of a preceding smelting procedure, a filled scrap basket 32 is held by the changing device 33 above the charging opening 42 of the projection 40 with the fingers 31 in the closed position. As a result, the material in the scrap basket 32 is heated by the hot gases that rise between the fingers 31 and through the scrap basket 32. The residence time of the scrap basket 32 is about 20 minutes, depending on what is referred to in the art as the "tap-to-tap" time (the time period between two tapping operations). In addition, the cast panels 37 lining the internal space also absorb heat and heat is communicated to the scrap. The top side of the scrap basket 32 is closed by the cover hood 50, whereby the gases rising through the scrap basket 32 are passed to the post-combustion chamber 60.

After the tapping operation of the preceding smelting procedure has been performed, the charge in the material basket 32 is charged by opening the fingers 31 when the electrodes 71 have been withdrawn from the vessel, which results in the condition illustrated in FIG. 2. Because the electrodes 71 have been withdrawn from the vessel, the electrodes cannot suffer from breakage due to scrap falling on them.

After the unloading operation, the column of scrap is not so high that the fingers 31 are prevented from pivoting back into the closed position.

Therefore, the emptied material basket 32 is immediately closed and replaced by the next filled scrap basket 32 by appropriate operation of the changing device 33. For that replacement operation, the hood 50 and the scrap baskets 32 are lifted, the cantilever arms 34 of the scrap changing device 33 are then rotated by 180° about the perpendicular rotational axis 35, and then the filled scrap basket 32 and the extraction hood 50 are lowered in the direction of the projection 40 (see the arrows B in FIG. 3). In the meantime, the electrodes 71 have been lowered again into the furnace vessel and, after the second scrap basket 32 is in position, power is supplied to the electrodes for melting the charge from the first scrap basket.

During the rotational movement of the material baskets 32 about the axis 35 (pivotal movement), the electrode arrangement 70 is not moved in the horizontal direction away from the projection 40 or the material baskets 32. As was already described above, if the material basket 32 has a rectangular cross-section in the horizontal direction, the material basket 32 is designed such that the corners just avoid touching the electrodes 71 during the pivotal movement. In the alternative, the material basket is first moved away from the electrode arrangement 70 in the horizontal direction (by horizontal movement or by pivotal movement about the horizontal axis 36) until the corners no longer collide with the electrode arrangement 70 during the pivotal movement. In another alternative, at least the side wall of the material basket 32 that is disposed towards the electrodes 71 has a convex shape with the radius of curvature R of the circular path, which convex shape avoids collision with the electrode arrangement 70 with a small clearance. In all three cases, this design prevents the electrode arrangement 70 from having to be moved away from the projection 40 in the horizontal direction.

When the charge from the first basket is being smelted, the material in the second scrap basket 32, which is positioned above the charging apparatus 42, is preheated in the same manner.

Further, when the material from the first basket has been smelted, the charge from the second basket is charged into the furnace vessel by opening the fingers 31 after the electrodes 71 have again been withdrawn from the vessel (in order to avoid electrode breakage due to scrap falling thereon).

As there is a relatively large molten bath in the lower vessel portion 11, the scrap of the second charge floats more strongly in the direction of the side of the vessel that is remote from the projection 40 in a horizontal direction. As a result, the column of solid scrap does not reach the height that is shown in FIG. 2 but is markedly lower.

At this time, the empty scrap basket 32 and the hood 50 are once again lifted and the empty scrap basket 32 is replaced by a full scrap basket 32, which in the meantime has been placed on the other cantilever arm 34 by the crane 90. In that way, while the second charge is being smelted, the next charge, which is already provided for the next smelting operation, is preheated.

After the electrodes 71 have been lowered again, the second charge is now smelted so that thereafter a molten bath is formed from the first and the second charges.

In the described embodiment, the furnace vessel and the scrap baskets are designed so that two charges are sufficient to completely fill the furnace. It will be appreciated that it is also possible for the corresponding dimensions of the furnace vessel to be modified in such a way that a third or another fraction of the total furnace filling amount is charged in one operation.

When changing the material baskets 32, the charging opening 42 is opened upwardly. In that condition, about 40 to 50% of the waste gases are suctioned away through the extraction opening 41. The remainder of the waste gases rises upwardly due to the temperature thereof and the majority is collected by the upper extraction hood 50. The remaining waste gases pass to the cover extraction arrangement 100 (see FIG. 9).

In comparison with known shaft furnaces, the extraction opening 41 and the upper extraction hood 50 substantially reduce the loading on the cover extraction arrangement 100, as is described hereinafter.

After the refining period for the molten bath consisting of the smelted first and second charges, a tapping operation is performed in a conventional manner.

Thereafter, the above-described procedure is repeated.

If it is not possible to change the scrap baskets, for example because repair operations are being performed, then the arc furnace can be operated, in accordance with the embodiments of the invention, in the second configuration that is shown in FIGS. 5 to 8. Operation in this configuration does not differ from the operation of a conventional arc furnace. The description thereof will therefore not be provided herein.

The design of the arc furnace in accordance with the embodiments of the invention, and the resulting possibility of the correspondingly described operation thereof, permit the following advantages.

By virtue of the relatively short residence time of the material baskets 32 above the projection 40 (about 20 minutes in a smelting operation) and the replacement thereof by another material basket that is filled with charging material at another location, the thermal loading on the fingers 31 and the side walls 37 is so low that it is possible to omit water cooling.

In the present embodiments, the interchangeable material baskets 32 are used instead of the conventional shaft and therefore, during the charging operation, there is no need, as is the conventional practice, for the entire amount of the scrap to be charged into the shaft from above in one operation. Instead, because charging is effected in relatively small portions into the material basket at the scrap storage location, the drop height of the scrap that will be charged in the direction of the fingers 31, as well as the amount that will be charged into the material basket at the same time, are drastically reduced. It is therefore possible to forego a complicated and expensive mounting arrangement for the fingers 31, and that results in a smaller structure and a considerable cost saving. As it is possible to forego water cooling for the fingers 31 and the side walls, there are also no problems due to leakages that can be caused by scrap falling thereon.

The material baskets 32 replace the scrap baskets that are required in any event in scrap-processing steel works. Thus, no additional expenditure is involved in this respect.

In conventional shaft furnaces, it was necessary to provide a way to move the shaft for repair purposes. That function is now performed by the changing device so that no additional expenditure worth mentioning is involved here.

In conventional shaft furnaces, a column of scrap extends into the shaft at the beginning of the smelting operation. Therefore, on the one hand, the waste gas passing over the column of scrap was cold and, on the other hand, there was no possible way to regulate the waste gas temperature and/or the waste gas composition utilizing the heat that is always present in the furnace.

The empty space that is always present in the projection 40, and in which there are the extraction opening 41 and the nozzles for fuel and/or oxygen, easily makes it possible to control and regulate the waste gas composition at any time during the smelting procedure. If for example the waste gas temperature and in particular also that portion which is removed through the hood 50 and/or the cover extraction arrangement 100 is too low, then above the column of scrap, above which there exists always an ignition temperature (flash point) of about 500° C. (this applies simply because of the scrap which is preheated to about 500° C.), by injecting carbon and/or oxygen, it is possible to produce hot waste gas that is fed to the post-combustion chamber 60 via the extraction opening 41 and the waste gas conduit 61. The post-combustion chamber 60 includes the waste gas analyzer so that the optimum composition of the waste gases that are to be subjected to post-combustion in the post-combustion chamber 60 can be adjusted by controlling the flow of the fuel and the oxygen and the position of the valves 64 and 65. In the same way for example an excess of CO can be eliminated by injecting oxygen into the projection 40.

The saving in terms of structural height above the furnace, which is afforded by virtue of the horizontal interchangeability of the material baskets 32, has already been discussed above.

In comparison with a conventional arc furnace, the overall power of the waste gas cleaning system can be reduced by about 60%, because the majority of the waste gases that escape are removed by the extraction opening 41 and the extraction hood 50, even when no material basket 32 is present.

The absence of the support structure for the shaft means that the material basket 32 can be placed significantly closer to the electrode arrangement 70. As a result, the horseshoe shape that is required in the case of conventional shaft furnaces can be greatly reduced to the round shapes that are more advantageous in terms of energy and structure.

The invention claimed is:

1. A metallurgical furnace comprising:
   a vessel having a maximum filling height defined therein,
   a cover coupled to the vessel,
   a projection mounted to one of the cover and the vessel and having a charging opening defined therein,
   a waste gas extraction opening defined in a lateral side of the projection,
   a charging apparatus arranged and constructed to charge material to be smelted into the vessel, the charging apparatus comprising at least first and second self-supporting material baskets arranged and constructed to be alternatively positioned above the projection, each basket defining an internal space and having a pivotable retaining means arranged and constructed to close an underside of the basket, wherein at least one space is defined in the pivotable retaining means to permit passage of hot gas emanating from the vessel into the internal space, wherein the pivotable retaining means is pivotable into the projection when material to be smelted is charged into the vessel, but the pivotable retaining means do not pivot below the maximum filling height, and
   means for positioning the material basket above the projection and for exchanging the first material basket with the second material basket.

2. A furnace according to claim 1, wherein the waste gas extraction opening is defined in the projection below the range of pivotal movement of the pivotable retaining means.

3. A furnace according to claim 2, wherein the waste gas extraction opening is defined above the maximum filling height.

4. A furnace according to claim 1, wherein the first and second material baskets each comprise at least one heat-retaining panel disposed on at least one inner side wall thereof.

5. A furnace according to claim 1, wherein the pivotable retaining means comprises a plurality of pivotable fingers, each being pivotable to a position below a bottom edge of respective side walls of the material basket, wherein the fingers are steel fingers, each having a thickness of at least 100 millimeters.

6. A furnace according to claim 1, wherein the projection comprises water-cooled elements and the material baskets do not comprise any water-cooled elements.

7. A furnace according to claim 1, further comprising an actuating member mounted on each material basket, the actuating member being arranged and constructed to actuate the pivotable fingers in order to open and close the underside of the material basket.

8. A furnace according to claim 1, wherein the moving means comprises a rotary turret arranged and constructed to exchangeably support the first and second material baskets via respective cantilever arms above the projection.

9. A furnace according to claim 1, further comprising an upwardly and downwardly movable extraction device disposed substantially vertically above the projection, the extraction device being arranged and constructed to
(i) sealingly contact an upper portion of the material basket disposed above the projection, when the extraction device is disposed in a downward position, so as to remove hot gases that rise upwardly through the projection and the material basket and
(ii) collect hot gases that rise upwardly from the projection, when the extraction device is disposed in a upward position that permits the first and second material baskets to be exchanged.

10. A furnace according to claim 1, further comprising means for injecting at least one of fuel and oxygen into the projection.

11. A furnace according to claim 10, further comprising a post-combustion chamber in communication with the projection and being arranged and constructed to incinerate pollutants exhausted from the vessel.

12. A furnace according to claim 11, further comprising:
a waste gas analyzer disposed at the post-combustion chamber, and
a controller arranged and constructed to control the injecting means based upon instructions from the waste gas analyzer.

13. A furnace according to claim 1, further comprising:
an extraction opening defined in the projection below the range of pivotal movement of the retaining means, but above the maximum filling height,
an actuating member mounted on each material basket, wherein the pivotable retaining means comprises a plurality of pivotable steel fingers that are pivotable to a position below a bottom edge of the side wall of the material basket, the actuation member being arranged and constructed to actuate the pivotable fingers in order to open and close the underside of the material basket,
a cover arranged and constructed to close the charging opening,
an extraction device disposed substantially perpendicularly with respect to the projection and above the charging device, the extraction device being arranged and constructed to suction hot gases that rise upwardly through the projection,
means for injecting at least one of fuel and oxygen into the projection,
a post-combustion chamber in communication with the projection and the extraction device and being arranged and constructed to incinerate pollutants exhausted from the vessel,
a waste gas analyzer disposed at the post-combustion chamber, and
a controller arranged and constructed to control the injecting means based upon instructions from the waste gas analyzer, and
wherein each material basket comprises at least one heat-retaining panel disposed on at least one inner side wall thereof and the changing means is arranged and constructed to pivot the material baskets in at least one of a horizontal plane and a vertical plane in order to exchange the first material basket with the second material basket.

14. A self-supporting material basket suitable for receiving scrap metal comprising:
a plurality of side walls defining an internal space having a cross-section that is substantially rectangular or convexly polygonal in a horizontal direction, the side walls being arranged and constructed to removably couple to a furnace vessel, and
a first plurality of fingers pivotably coupled via a first shaft to a lower portion of a first one of the side walls,
a second plurality of fingers pivotably coupled via a second shaft to a lower portion of a second one of the side walls that opposes the first one of the side walls,
wherein each of the first and second plurality of fingers has a length approximately half the length of the internal space in the horizontal direction, intervening spaces are defined between the first and second plurality of fingers for permitting gas to pass therethrough, the fingers are arranged and constructed to be disposed in a closed position of an underside of the internal space in a plane substantially perpendicular to the side walls and ends of the fingers are adapted to be supported in the closed position by a support disposed on a carriage, and
an actuating member coupled to the plurality of fingers and being arranged and constructed to pivot the fingers so as to open and close the underside of the internal space.

15. A material basket according to claim 14, wherein the material basket is arranged and constructed to be held by a change device and to be pivotable with respect to the furnace vessel along a first radius of curvature, and at least one of the side walls has a convex configuration with a second radius of curvature in the horizontal direction, the first radius of curvature being substantially equal to the second radius of curvature.

16. A material basket according to claim 15, wherein the side walls and fingers are arranged and constructed to hold at least 50 tons of scrap material.

17. A material basket according to claim 16, wherein the side walls and fingers are arranged and constructed to withstand a temperature of at least about 500° C. for at least about 20 minutes.

18. A metallurgical furnace comprising:
a furnace vessel,
a cover covering at least a portion of an upper side of the furnace vessel,
a vertically-oriented projection mounted on one of the cover and the upper side of the furnace vessel, wherein the projection extends above an upper edge of the furnace vessel and includes an upwardly-facing opening for receiving material to be smelted in the furnace vessel,
means for injecting at least one of fuel and oxygen into the projection,
at least first and second material baskets arranged and constructed to hold and charge the material to be smelted into the vessel via the upwardly-facing opening of the projection, each basket having a pivotable material retaining means arranged and constructed to close an underside of the basket, at least one space being defined in the pivotable retaining means for permitting passage of hot gases emanating from the furnace vessel via the projection into an interior of the material basket, and wherein the pivotable retaining means and the projection are dimensioned such that ends of the pivotable retaining means are pivotable into an interior of the projection when the material to be smelted is being charged into the vessel, but the ends of the pivotable retaining means are not pivotable below a maximum filling height of the furnace, and means for moving the first and second materials basket to as to alternately position the first and second material baskets above the projection for charging the furnace vessel with the material to be smelted via the projection.

19. A furnace according to claim 18, further comprising a waste gas extraction opening defined in a lateral side of the projection, the waste gas extraction opening being defined in the projection above the maximum filling height of the furnace and below the range of pivotal movement of the pivotable retaining means of the material baskets.

* * * * *